United States Patent [19]

Ratkowski

[11] Patent Number: 4,769,431

[45] Date of Patent: * Sep. 6, 1988

[54] POLYACRYLOXYALKYLSILANOL LENS COMPOSITION, ARTICLES AND METHOD OF MANUFACTURE

[75] Inventor: Donald J. Ratkowski, Mesa, Ariz.

[73] Assignee: Paragon Optical Inc., Mesa, Ariz.

[*] Notice: The portion of the term of this patent subsequent to Apr. 12, 2003 has been disclaimed.

[21] Appl. No.: 864,523

[22] Filed: May 19, 1986

Related U.S. Application Data

[63] Continuation of Ser. No. 678,097, Dec. 4, 1984, abandoned.

[51] Int. Cl.$^4$ .................... C08F 130/08; C08F 230/08
[52] U.S. Cl. .................................................. 526/279
[58] Field of Search ................. 526/279, 218.1, 219.6, 526/232.1, 227

[56] References Cited

U.S. PATENT DOCUMENTS

| | | | |
|---|---|---|---|
| 4,419,505 | 12/1983 | Ratkowski et al. | 526/279 |
| 4,424,328 | 1/1984 | Ellis | 526/279 |
| 4,535,138 | 8/1985 | Ratkowski et al. | 526/279 |
| 4,582,884 | 4/1986 | Ratkowski et al. | 526/279 |

Primary Examiner—Joseph L. Schofer
Assistant Examiner—Peter F. Kulkosky
Attorney, Agent, or Firm—Richard R. Mybeck

[57] ABSTRACT

A copolymer composition, especially suited for fabricating optical lenses comprising a copolymer of copolymerized comonomers which include in weight percent about one to about twenty percent by weight of an acryloxyalkylsilanol; about one to about fifteen percent of a polyacryloxyalkylpolysiloxane; about thirty to about seventy five percent of an siloxy substituted ester of acrylic or methacrylic acid; from about one to about 35 percent of an alkyl or cycloalkyl acrylate or methacrylate having from one to twenty carbon atoms; from about one to about twenty percent of a polyol diacrylate; and from about one to about twenty percent of a wetting monomer.

Contact lenses and contact lens buttons are formed of such copolymer of copolymerized comonomers by conventional techniques, by injection molding, and by compression molding.

16 Claims, No Drawings

POLYACRYLOXYALKYLSILANOL LENS COMPOSITION, ARTICLES AND METHOD OF MANUFACTURE

INTRODUCTION

This application is a continuation of my earlier U.S. patent application Ser. No. 678,097 filed Dec. 4, 1984, now abandoned.

The present invention relates to new and unique copolymer compositions, methods for handling said copolymers to mold or cast them into optical lenses, especially contact lenses or blanks from which contact lenses may be shaped, and to the buttons and lenses resulting therefrom.

More particularly, the present invention relates to novel copolymer compositions having distinctly improved extended wear properties while providing wettability, mechanical stability and optical clarity essential for optical lenses including interoccular and contact lenses, or the buttons and blanks from which such lenses may be shaped. The buttons or blanks can be formed by either conventional forming techniques, by injection molding or by compression casting.

Furthermore, this invention concerns oxygen-permeable copolymers from which contact lenses and the like can be produced having improved extended wear properties. In addition, these copolymers can be used to manufacture contact lenses by industry-standard manufacturing techniques as well as by injection molding or casting which lenses can be cleaned with standard contact lens cleaning solutions without any special surface treatments to impart wettability. For purposes of the following discussion, this invention will be described in terms of contact lenses although it is readily applicable to various otpical lenses and other applications.

BACKGROUND OF THE INVENTION

So-called "hard" contact lenses and compositions for fabricating them are well known in the art. The standard contact lens used for many years was fabricated from polymethyl methacrylate (PMMA) and achieved widespread use throughout the world, despite the fact that a PMMA lens is essentially impermeable to oxygen. The lack of oxygen at the interface between the contact lens and the cornea will, after even short periods of time, i.e., less than one day, cause discomfort to the wearer because of edema induced by the lack of oxygen at the surface of the cornea. Consequently, PMMA lenses must be removed at least daily and preferably more often to expose the surface of the cornea to ambient atmospheric oxygen and thereafter replaced, a bothersome procedure.

In an attempt to remedy these defects inherent in standard PMMA contact lenses, the art devised other copolymer contact lens compositions having improved oxygen-permeability which allow the user to wear the lenses for longer periods of time, sometimes several days, before they must be removed for cleaning. These oxygen-permeable lenses are of two general types, the so-called "soft" lens formed of the very flexible Hydrogel ® material and the so-called "hard permeable" lens formed of a solid copolymer of methyl methacrylate with various comonomers. The hard permeable lens avoids certain problems associated with the so-called soft lens, principally in its resistance to contamination and breakage, and provides ease of cleaning and resistance to surface scratching.

Although the hard permeable contact lens compositions represented a marked improvement over standard PMMA polymers in terms of oxygen-permeability, they nevertheless suffered certain disadvantages in comparison to standard PMMA lenses in terms of wettability, mechanical stability and chemical stability. Moreover, certain of the present day hard permeable copolymers require special surface pre-treatment to improve wettability and/or special lens treatment solutions which are used throughout the life of the lens to improve or maintain surface properties. Furthermore, the hard permeable copolymers are inherently brittle with the result that they frequently chip at their edges and break. Such chipping obviously creates a potential health hazard to the wearer and imposes a definite economic burden because they must be replaced.

This invention will be best understood by reference to the prior art described in Keogh, U.S. Pat. No. 4,259,467, and Ratkowski et al, U.S. Pat. No. 4,419,505, and the several references cited therein. Further background is available from Gaylord, U.S. Pat. No. 3,808,178; Ellis et al, U.S. Pat. No. 4,168,122; Ellis et al, U.S. Pat. No. 4,152,508; Novicky, U.S. Pat. No 4,216,303; Novicky, U.S. Pat. No. 4,242,483; Neefe, U.S. Pat. No. 4,306,042 and Foley, E.P. No. 75004.

SUMMARY OF THE INVENTION

As is apparent from the art, a definite need exists for and it would be highly advantageous to provide a hard oxygen-permeable contact lens composition, lenses manufactured thereof, and methods for manufacturing lenses or lens blanks (buttons) therefrom, all of which could provide contact lenses having at least the oxygen-permeability characteristic exhibited by presently available hard permeable lenses, which would have improved wettability, and which would provide significant production economies, especially if such composition can be used to manufacture contact lenses or buttons therefor, using not only the standard procedures and equipment already known for manufacture of PMMA lenses, but using injection molding or casting in such a way that special surface pre-treatments or periodic surface treatments to attain and maintain the desired surface properties are no longer required. Further, if such lens could also have the ability for extended wear, that is, permit the user to keep the lens in place for several weeks, up to a month or more, a major breakthrough would be accomplished.

This disclosure is based upon the discovery of lens copolymer compositions, lenses fabricated therefrom, and methods for manufacture of lenses employing such compositions which achieve the aforedescribed breakthrough in a remarkably unexpected fashion as will be readily discerned from a detailed reading of the following disclosure and examples thereof.

Accordingly, a prime object of the present invention is to provide a new and improved optical lens composition especially useful for the manufacture of contact lenses therefrom having excellent oxygen-permeability, improved wettability, enhanced dimensional stability and extended wearability.

Another object of the present invention is to provide a new and improved optical lens composition from which lenses can be fabricated using standard production methods as well as by injection molding and casting which require no special surface treatment to achieve efficacious use.

A further object of the present invention is to provide a new and improved composition for the fabrication of optical lens having unexpectedly superior toughness, dimensional stability, clarity, durability, hardness, wettability and high values of oxygen permeability.

Still a further object of the present invention is to provide a new and improved extended wear lens composition which is capable of producing either hard or soft optical lenses which have and retain optimum physical properties while being readily formed into a variety of optical shapes.

These and still further objects as shall hereinafter appear are readily fulfilled by the present invention in a remarkably unexpected manner as will be readily discerned from the following detailed description of an exemplary embodiment thereof.

DESCRIPTION OF PREFERRED EMBODIMENTS

Briefly stated, the composition of the present invention comprises a copolymer derived from comonomers which include a methacryloxyalkylsilanol; a di(methacryloxyalkyl) polysiloxane; a tris(trialkylsiloxy)methacryloxyalkylsilane and an alkyl methacrylate. The corresponding acrylic acid esters may be used for any of the foregoing components. In the preferred composition, acrylic or methacrylic acid will be used as a wetting agent and, a polyfunctional ester, derived from the reaction of acrylic or methacrylic acid with an aliphatic di- or polyol (e.g. ethylene glycol, tetraethylene glycol, glycerol and the like), will be used as a crosslinker. Prior to polymerization, an appropriate initiator is introduced into the mixture of comonomers.

The invention also provides, as new articles of manufacture, lenses fabricated from these copolymers having extraordinary extended wear which can be produced by injection molding, compression molding or casting either into the desired lens shape or into a lens button or blank from which a lens may be shaped.

The invention will be best understood by reference to the prior art previously identified, namely, Ratkowski et al, U.S. Pat. No. 4,419,505, and Keogh, U.S. Pat. No. 4,259,467, (including the several references cited therein).

While the copolymers of the present invention bear some similarities to those described by Gaylord, U.S. Pat. No. 3,808,178; Ellis et al, U.S. Pat. Nos. 4,168,122 and 4,152,508 and Novicky, U.S. Pat. Nos. 4,216,303 and 4,242,483, Neefe U.S. Pat. No. 4,306,042 and Foley E.P. No. 75004 (in that they are copolymers of alkyl acrylic esters with acrylic silane esters), they differ significantly, as will hereafter appear, in that the comonomers of the present invention include an acryloxyalkylsilanol or a methacryloxyalkylsilanol, a siloxyalkyl acrylate or methacrylate, a di(acryloxyalkyl)polysiloxane or a di(methacryloxyalkyl)-polysiloxane, and a $C_1$–$C_{20}$ alkyl or cycloalkyl ester of acrylic or methacrylic acid as essential components. For purposes of this specification it is to be understood that the term "acryloxy" includes methacryloxy and the term "acrylic" includes methacrylic.

The presence of an acryloxymethylsilanol and a dimethacrylpolysiloxane in the comonomer mixture in combination with an siloxyalkyl acrylate or methacrylate, an alkyl or cycloalkyl ester of acrylic or methacrylic acid, methacrylic acid or other wetting agent and a polyol polyacrylate in carefully selected ratios in the presence of an appropriate initiator leads to copolymers which have distinctly improved extended wear properties and which enable one to manufacture contact lenses, or buttons therefor, and other optical lenses by those industry-standard techniques known in connection with the manufacture of PMMA lenses. Further, the mechanical stability of the copolymer also provides lenses having improved stability of lens curvature which affects focus distance and sharpness. No surface treatment is required to improve lens wettability and no special cleaning solutions are required to maintain surface properties.

In general, the contact lens copolymer compositions (by weight percent) of the present invention are formed by copolymerizing comonomers which include 1 to 40% of an acryloxyalkylsilanol; 1 to 75% of a diacrylpolysiloxane; 1 to 75% of a siloxyalkyl ester of acrylic or methacrylic acid; and from 1 to 35% of a $C_1$–$C_{20}$ alkyl or cycloalkyl ester of acrylic or methacrylic acid.

The acryloxyalkylsilanols which are essential comonomers in forming the copolymer of the present invention are of the general structure:

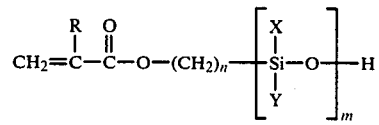

wherein:

R=CH$_3$— or H—;

X,Y=C$_1$–C$_6$ alkyl, cyclohexyl, phenyl, or Z;

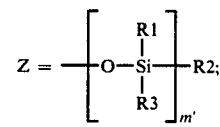

n=1–5; m=1–3; m'=1–3;

R1=C$_1$–C$_6$ alkyl, cyclohexyl, or phenyl;
R2=C$_1$–C$_6$ alkyl, cyclohexyl, or phenyl; and
R3=C$_1$–C$_6$ alkyl, cyclohexyl, or phenyl.

Representative acryloxyalkylsilanols of this type include: bis(trimethylsiloxy)-γ-methacryloxypropylsilanol; methyl(trimethylsiloxy)-methacryloxymethylsilanol; methyl(trimethylsiloxy)-β-methacryloxyethylsilanol; methyl(trimethylsiloxy)-γ-methacryloxypropylsilanol; bis(trimethylsiloxy)-β-methacryloxyethylsilanol; bis(trimethylsiloxy)-methacryloxymethylsilanol; (trimethylsiloxy)(pentamethyldisiloxanyl)-methacryloxymethylsilanol; (trimethylsiloxy)-(pentamethyldisiloxanyl)-β-methacryloxyethylsilanol; and (trimethylsiloxy)-(pentamethyldisiloxanyl)-γ-methacryloxypropylsilanol The polysiloxane diacrylates used in this invention, sometimes called polyacryloxyalkyl polysiloxanes herein, have the general stucture:

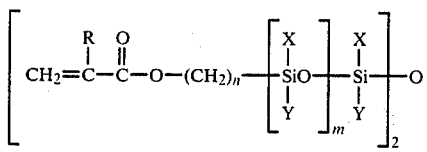

wherein:
R=CH₃— or H—
m=0-3
n=1-5
X=$C_1$-$C_6$ alkyl, cyclohexyl, phenyl or Z;
Y=$C_1$-$C_6$ alkyl, cyclohexyl, phenyl or Z;

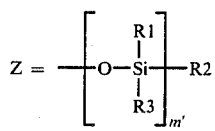

m'=1-3
R1=$C_1$-$C_6$ alkyl, cyclohexyl, or phenyl;
R2=$C_1$-$C_6$ alkyl, cyclohexyl, or phenyl; and
R3=$C_1$-$C_6$ alkyl, cyclohexyl, or phenyl.

Representative polysiloxane diacrylates are:
1,3-bis(methacryloxypropyl)-1,1,3,3-tetrakis(trimethylsiloxy)disiloxane;
1,3-bis(acryloxymethyl)-1,1,3,3-tetrakis(trimethylsiloxy)disiloxane;
1,3-bis(methacryloxypropyl)-1,1,3,3-tetrakis(triethylsiloxy)disiloxane; and
1,5-bis(methacryloxymethyl)-1,1,3,3,5,5-hexa(trimethylsiloxy)trisiloxane.

The siloxyalkyl acrylates have the general structure:

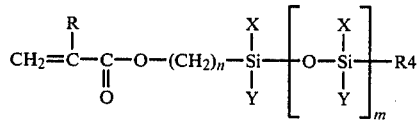

wherein
R=CH₃— or H—;
X=$C_1$-$C_6$ alkyl, cyclohexyl, phenyl or Z;
Y=$C_1$-$C_6$ alkyl, cyclohexyl, phenyl or Z;

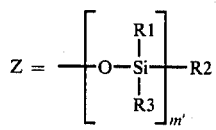

R1=$C_1$-$C_6$ alkyl, cyclohexyl, or phenyl; m=1-3;
R2=$C_1$-$C_6$ alkyl, cyclohexyl, or phenyl; n=1-5;
R3=$C_1$-$C_6$ alkyl, cyclohexyl, or phenyl; m'=1-3; and
R4=$C_1$-$C_6$ alkyl.

Representative siloxyalkyl acrylates are: γ-methacryloxypropyl-tris(trimethylsiloxy)silane; γ-acryloxypropyl-tris(trimethylsiloxy)silane; and 5-methacryloxypropyl-1,1,1-trimethyl-3,3,5,5-tetrakis(trimethylsiloxy)-trisiloxane.

The $C_1$-$C_{20}$ alkyl and cycloalkyl esters of acrylic or methacrylic acid which are useful as comonomers in forming the copolymer of the present invention include: methyl acrylate and methyl methacrylate; ethyl acrylate and ethyl methacrylate; propyl acrylate and propyl methacrylate; isopropyl acrylate and isopropyl methacrylate; butyl acrylate and butyl methacrylate; amyl acrylate and amyl methacrylate; hexyl acrylate and hexyl methacrylate; heptyl acrylate and heptyl methacrylate; octyl acrylate and octyl methacrylate; 2-ethylhexyl acrylate and 2-ethylhexyl methacrylate; nonyl acrylate and nonyl methacrylate; decyl acrylate and decyl methacrylate; undecyl acrylate and undecyl methacrylate; lauryl acrylate and lauryl methacrylate; cetyl acrylate and cetyl methacrylate; octadecyl acrylate and octadecyl methacrylate; and cyclohexyl methacrylate and cyclohexyl acrylate.

Other vinyl monomers which readily copolymerize with methylmethacrylate may be used in place of part or all of the preferred acrylates or methacrylates listed in the preceeding paragraph. Suitable replacement vinyl monomers include styrene, α-methylstyrene, alkylated styrenes, diethyl itaconate, perfluorylethyl vinyl ether, isoprene, isobutylene, 4-methyl-1-pentene and chlorotrifluoro ethylene. Preferably these monomers have a molecular weight of less than 300.

The copolymers of the invention are prepared by mixing comonomers with an initiator. My preferred initiator is a free-radical-generating-polymerization-initiator of the type commonly used in polymerizing ethenyl functioning unsaturated compounds. Representative free radical polymerization initiators include:

acetyl peroxide; lauroyl peroxide; decanoyl peroxide; capryl peroxide; benzoyl peroxide; tertiary-butyl peroxypivalate; diisopropyl peroxycarbonate; tertiary-butyl peroctoate; 2, 2',-azobis(isobutyronitrile); 2, 2',-azobis(2,4-dimethylvaleronitrile); methyl ethyl ketone peroxide; di(2-phenoxyethyl)peroxydicarbonate; and di(2-phenoxyethyl)methyl ethyl ketone peroxide.

Conventional polymerization techniques are employed to produce the novel copolymers. The comonomer mixture containing between about 0.05-2% by weight of the free radical initiator is heated to a temperature between 30° C.–100° C., preferably below 70° C., to initiate and complete the polymerization.

The polymerization mixture can be heated in a suitable mold or container to form discs, rods or sheets which can then be machined to the desired shape using conventional equipment and procedures employed for fabricating lenses from polymethyl methacrylate. The temperature is preferably maintained below 70° C. in order to minimize the formation of bubbles in the copolymer. Instead of employing the bulk polymerization techniques described above, one can employ solution, emulsion or suspension polymerization to prepare the novel copolymers, using techniques conventionally used in the preparation of polymers from vinyl functioning unsaturated monomers (—CH=CH₂), that is, ethenyl-functioning monomers. The copolymer thus produced may be pressed or molded into rods, sheets or other convenient shapes which are then cut into buttons and thereafter machined to produce the contact lenses. Alternatively, the copolymer can be directly cast or molded into finished contact lenses or lens blanks with planar, convex or concave surfaces or any desired combination thereof.

In a preferred practice of the present invention, the monomer mixture is thermally polymerized in an appropriate mold or vessel to provide a block, sheet, rod, or plug, each of which may have a radius convex or radius concave or a plano surface, to provide a semifinished or finished contact lens or other optical lens. The mold and vessel utilized will be formed of polypropylene, polyethylene, nylon, Teflon®, glass, or aluminum having its mold surface coated with Teflon®. As will hereinafter appear, certain applications are well served using glass test tubes or rods as the forming mold.

The wettability of the copolymers described above is improved by the addition to the copolymerization mixture of from about 1-20 parts by weight of a hydrophilic monomer. Such monomers include hydroxyalkyl acrylates and methacrylates wherein the alkyl group contains about 2 to 5 carbon atoms, acrylic and methacrylic acid, acrylamide, methacrylamide, 2-hydroxyethyl methacrylate, N-methylolacrylamide, N-methylolmethacrylamide, glycidyl acrylate and methacrylate, and N-vinylpyrrolidone. The hydrophilic monomer content of the copolymerization mixture is preferably about 3 to about 12 percent by weight.

The resistance of lenses fabricated from the copolymer of the present invention to lens flexure and warpage may be increased, if desired, by the incorporation into the copolymerization mixture of from about 1 to about 20 percent by weight of an acrylic ester of an alkyl polyol such as, for example, ethylene glycol dimethyacrylate, butylene glycol dimethacrylate, neopentyl glycol diacrylate and pentaerythritol triacrylate or tetraacrylate. The alkylpolyol polyacrylate content of the polymerization mixture is preferrably from about 3 to about 12 percent by weight of the total composition.

The principal function of the silanol moiety of the copolymer of the present invention is to improve the mechanical properties of conventional PMMA contact lens polymers. It appears that the inclusion of the silanol as one of the comonomers in the polymerization mixture chiefly affects the warpage characteristics of the copolymer which, in turn, as previously noted, determines the stability of lens curvature which controls focus distance and sharpness. In addition, the silanol moiety of the copolymer imparts significantly improved oxygen permeability and wettability. Consequently, although the silanol component of the copolymerization mixture may be varied within the 1-40 percent by weight as set forth above, the preferred combination of mechanical and oxygen-permeability properties and wettability is achieved by employing about 1-20 percent by weight of the silanol in the copolymerization mixture. Optimum results are obtained with a silanol concentration of 2-10% by weight in the polymerization mixture.

In order to achieve the superior physical properties of the copolymers of the present invention, it is essential to incorporate from about two to sixty percent by weight of the diacryloxypolysiloxane in the copolymerization mixture. Optimum results have been achieved when from about four up to about sixty weight percent of a diacryloxypolysiloxane is included in the mixture. This type of comonomer makes possible the introduction of polysiloxane crosslinks as well as pendant groups having acryl and polysiloxane moieties. Such crosslinks and pendant groups enhance such important properties as oxygen permeability and dimensional stability, which provides greater visual acuity and enhanced durability in the final lens. Accordingly, the incorporation of a diacryloxypolysiloxane in the monomer mixture contributes essential properties to the novel lens materials of this invention.

The siloxyalkyl acrylates also contribute to the oxygen permeability of the copolymers of the present invention. Optimum overall properties of the copolymers are obtained when the concentration of the siloxyalkylacrylates in the polymerization mixture is from about 5% to about 60% by weight.

Within the foregoing limitations, the amount of $C_1$-$C_{20}$ alkyl or cycloalkyl esters of acrylic or methacrylic acids in the copolymerization mixture is preferably ten to thirty-five percent by weight.

The particular free radical polymerization initiator employed in accordance with the preferred practice of the invention is selected by reference to the required initiation temperature. Thus, if conventional polymerization techniques are employed to produce cast rods or other shapes which are then machined to produce the desired lenses, the preferred initiators are 2, 2'-azobis-(isobutyronitrile), 2, 2'-azobis(2, 4-dimethylvaleronitrile), benzoyl peroxide, di(2-phenoxyethyl)peroxydicarbonate, t-butyl peroxyprivalate, and the like.

On the other hand, if it is desired to produce contact lenses or contact lens blanks by injection molding or direct casting, then a polymerization initiator having a higher initiation temperature would be employed in order to prevent premature polymerization in the injection molding or casting cavities. Such an initiator can be a mixture of methyl ethyl ketone peroxide and cobalt naphthenate.

In one practice of the present invention, a copolymerization mixture is prepared by mixing the following comonomers, in the relative weight ratios indicated, in a plastic container equipped with a conventional stirring and blending device.

A mixture containing a hydroxysilane acrylate (also called acryloxyalkylsilanols) selected from the group consisting of: bis(trimethylsiloxy)-γ-methacryloxypropylsilanol; methyl(trimethylsiloxy)methacryloxymethylsilanol; methyl(trimethylsiloxy)-β-methacryloxyethylsilanol; methyl(trimethysiloxy)-γ-methacryloxypropylsilanol; bis(trimethylsiloxy)-β-methacryloxyethylsilanol; bis(trimethylsiloxy)-methacryloxymethylsilanol; (trimethylsiloxy)-(pentamethyldisiloxanyl)-methacryloxymethylsilanol; (trimethylsiloxy)-(pentamethyldisiloxanyl)methacryloxymethylsilanol, and (trimethylsiloxy)(pentamethyldisiloxanyl)-γ-methacryloxypropylsilanol; a polysiloxane diacrylate (also called a polyacryloxyalkyl polysiloxane) selected from the group consisting of: 1,3-bis(methacryloxypropyl)-1,1,3,3-tetrakis(trimethylsiloxy) disiloxane; 1,3-bis(acryloxymethyl)-1,1,3,3-tetrakis(trimethylsiloxy) disiloxane; 1,3-bis(methacryloxypropyl)1,1,3,3-tetrakis(triethylsiloxy) disiloxane; and 1,5-bis(methacryloxymethyl)-1,1,3,3,5,5-hexa(trimethylsiloxy) trisiloxane; an siloxyalkyl acrylate selected from the group consisting of:

γ-methacryloxypropyl-tris(trimethylsiloxy)silane; γ-acryloxypropyl-tris(trimethylsiloxy)silane; and 5-methacryloxypropyl-1,1,1-trimethyl-3,3,5,5,tetrakis(-trimethylsiloxy)trisiloxane; an alkyl or cycloalkyl ester of acrylic or methacrylic acid in which said alkyl or cycloalkyl has 1-20 carbon atoms; a wetting agent; a polyol-polyacrylate crosslinker and an initiator.

The copolymerization mixture will preferably contain from about 2-10 percent by weight of the silanol; from 10-25 percent by weight of $C_1$-$C_{20}$ alkyl or cycloalkyl ester of acrylic or methacrylic acid; from about 5 to about 60 percent by weight of an siloxyalkyl acrylates; from 4 to about 60 percent by weight of a polysiloxane diacrylate; from about 5 to about 11 percent by weight of a wetting agent; from about 5 to about 10 percent by weight of a polyol diacrylate crosslinker; and about 0.1 to about 1.0 percent by weight of initiator.

The mixture, when stirred for about 20 minutes, is readily pourable into a preselected mold which may be constructed of polypropylene, polyethylene, nylon, Teflon ®, glass or aluminum having a molding surface coated with Teflon ®. The mold when filled with the copolymerization mixture is placed into a water or silicone bath which in turn is placed into a vacuum oven.

Alternatively, the resulting and readily pourable copolymerization mixture can be converted into a solid of the desired shape in a Teflon-coated aluminum tube. In any case, the selected mold will have been thoroughly cleaned, as with a dry brush and an anti-static air gun, to remove all particulates therefrom.

The filled molds are then placed in a water or silicone bath which in turn is placed into the oven. A very slight nitrogen flow is maintained through the oven.

The oven, containing the filled molds in the nitrogen environment, is heated to 40°–50° C. to commence polymerization of the copolymer and this temperature is maintained for a period of from 12 to 48 hours at which time the oven temperature is raised to 60°–70° C. for an additional 18 to 48 hours to complete polymerization. When heating at 60°–70° C. is completed, the oven is cooled to room temperature and the copolymer solids, e.g., rods or blanks are removed from their molds (the polymerization tubes) by gently tapping the bottom of each tube.

The copolymer rods or blanks, thus removed from their respective molds, are annealed by placing them upon suitable trays which are then placed in an oven.

The oven is then evacuated to approximately 5 mm Hg and heated to a temperature of from 100° to 150° C. for a period of from about 8 to about 36 hours. The duration of the annealing process is inversely related to the temperature selected.

After heating for the desired time, the oven is cooled to ambient temperature at which time atmospheric air is slowly admitted into the oven until the oven interior reaches atmospheric pressure.

When the oven is thus cooled and the pressure balanced, the trays containing the annealed rods or blanks are removed from the oven and the annealed pieces are collected.

When contact lenses or blanks are the ultimate objective, the rods will be machined to the desired diametric dimension, i.e., about ½ inch (13 mm) and then sliced into a plurality of buttons, each having a thickness of approximately 3/16 inch (4 mm).

It should be noted that the copolymerization mixture of the present invention can be tinted using any of the physiologically compatible color pigments or dyes currently used in PMMA contact lenses. Other dyes which are characterized as Food, Drug, and Cosmetic dyes and Drug and Cosmetic dyes and are physiologically compatible with the optic environment can also be used. Thus lenses having blue, grey, green and brown tints as well as clear lenses can be produced by the present invention.

To further aid in the understanding of the present invention but not as a limitation thereupon, reference is made to the following Examples.

EXAMPLE 1

A copolymerization mixture is prepared by mixing the following comonomers in the relative weight ratios indicated in a plastic mixing container and stirring for twenty minutes.

| Comonomers | Parts by weight |
| --- | --- |
| Bis(trimethylsiloxy)-γ-methacryloxypropylsilanol | 7 |
| 1,3-Bis(γ-methacryloxypropyl)-1,1,3,3-tetrakis(trimethylsiloxy)disiloxane; | 7 |
| γ-Methacryloxypropyl-tris-(trimethylsiloxy)silane | 48 |
| Methyl Methacrylate | 20 |
| Methacrylic Acid | 10 |
| Ethylene Glycol Dimethacrylate | 8 |
| Initiator | |
| 2,2'-azobis(isobutyronitrile) | 0.2 |

The resulting copolymerization mixture is readily poured into a plurality of thoroughly cleaned tubes, each of which presents a cylindrical mold cavity of approximately 15 mm in diameter and 42 mm in length.

The filled tubes are then placed into a water or silicone bath which is, in turn, placed in an oven. A very slight positive nitrogen flow is maintained through the oven.

The oven containing the molds in the nitrogen environment is then heated to 40°–50° C. for 24–48 hours and thereafter the temperature is increased to 60°–70° C. for an additional 18–36 hours to complete polymerization. The oven is thereafter cooled to room temperature and the copolymer rods are removed from the molds.

The copolymer rods are annealed by placing them flat in trays which are placed into the vacuum oven. The oven is then evacuated to approximately 5 mm Hg and the oven is heated to 100°–150° C. for 8–36 hours according to Table A below.

TABLE A

| Temperature (°C.) | Duration (hours) |
| --- | --- |
| 100 | 36.0 |
| 105 | 33.2 |
| 110 | 30.4 |
| 115 | 27.6 |
| 120 | 24.8 |
| 125 | 22.0 |
| 130 | 19.2 |
| 135 | 16.4 |
| 140 | 13.6 |
| 145 | 10.8 |
| 150 | 8.0 |

The oven is then cooled to ambient temperature at which time atmosphere air is slowly admitted into the oven until the oven interior reaches atmospheric pressure. The trays containing the annealed rods are then removed from the oven and the rods are collected. Each rod is then machined to the desired diametric dimension, about 13 mm, and thereafter sliced into a plurality of buttons (lens blanks), each being approximately 4 mm thick.

EXAMPLE 2

Standard Method for Determining Wetting Angle

Ten contact lens buttons (approximately 13 mm in diameter and 4 mm thick) are prepared by slicing one of the copolymer rods produced according to Example 1, "facing" one flat surface of each button with a diamond turning tool and polishing the faced surface to the degree normally acceptable by contact lens standards. After immersing the buttons in a contact lens soaking solution such as benzalkonium chloride (available as SOCLENS ® from Alcon) or the like for 24 hours, each button is thoroughly washed with distilled water, blotted dry, and then thoroughly dried under vacuum in a 40° C. oven for one week. After this preparation, the buttons are subjected to wetting angle determinations as described in the "Standard Method for Determining Wetting Angle" issued by the Contact Lens Manufacturers Association, Chicago, Ill., dated Apr. 10, 1978. Note that the smaller the "wetting angle" (in degrees), the better the tear pump exchange. The results obtained for the ten buttons of this example gave an average wetting angle of 26.0° with a standard deviation of ±1.50°.

EXAMPLE 3

For comparison, the wetting angles of other commercially available contact lens polymers and copolymers were determined utilizing the same procedure as described in Example 2. The results are reported in Table B, below:

TABLE B

| Polymer | Wetting Angle Degrees | Standard Deviation (±Degrees) |
|---|---|---|
| PARAGON 18 ® (Paragon) | 18.3 | 0.49 |
| PMMA #2 (Glassflex TM) | 25.6 | 1.77 |
| PMMA #4 (Glassflex TM) | 24.3 | 3.8 |
| Polycon ® (Gaylord-Syntex) | 30.4 | .77 |
| Sil-O$_2$-Flex ® (Novicky) | 25.4 | — |
| Boston (Ellis)(Polymer Tech) | 33.3 | — |
| PARAGON 95 | 20.4 | — |
| PARAPERM ® O$_2$ (Paragon) | 23.1 | 1.63 |

EXAMPLE 4

The contact lens copolymers of Examples 2 and 3 were tested for oxygen-permeability with a Schema-Versatae polarographic amplifier using the polarographic current. Permeability is expressed as the Dk unit with "D" being the diffusion coefficient and "k" being a solubility constant.

$Dk = (y)10^{-11}(cm^2/sec)(ml\ O_2 \times ml \times mm\ Hg)$ The contact lens is measured by 35° to 37° in an atmospherically controlled chamber. The schema versatae accuracy for low permeable materials, i.e., under Dk 30, is $\pm 1 \times 10^{-11}$ and for high permeable materials, i.e., over Dk 30, is $\pm 3 \times 10^{-11}$. The results are reported in Table C, below:

TABLE C

| Polymer | O$_2$ Permeability (Dk × 10$^{-11}$)* |
|---|---|
| PARAGON 95 (Paragon) | <1 |
| PARAGON 18 ® (Paragon) | <1 |
| PMMA #2 (Glassflex TM) | <1 |
| PMMA #4 (Glassflex TM) | <1 |
| Polycon ® (Gaylord-Syntex) | 3.8 |
| Polycon ® II (Syntex) | 9.9 |
| Sil-O$_2$-Flex ® (Novicky) | 7.5 |
| Boston (Ellis) (Polymer Tech) | 11.1 |
| Boston II (Polymer Tech) | 14.6 |
| Boston IV (Polymer Tech) | 26.0 |
| PARAPERM ® O$_2$ (Paragon) | 15.6 |
| PARAPERM ® O$_2$ PLUS (Paragon) | 39.0 |
| Example 1 | 56 |

*(cm$^2$/sec) (ml O$_2$/ml × mm Hg)

EXAMPLES 5-25

Following the general procedure as described in Example 1, copolymers are prepared for use in fabricating contact lenses which, depending on the specific application, have a desired combination of mechanical strength, dimensional stability, optical clarity, oxygen permeability, wettability, and extended wear. These copolymers are identified in Tables D-1, D-2, and D-3, below.

TABLE D

| | Parts by weight in copolymerization mixture | | | | | | |
|---|---|---|---|---|---|---|---|
| | Example | | | | | | |
| Comonomer | 5 | 6 | 7 | 8 | 9 | 10 | 11 |
| Bis(trimethylsiloxy)-γ-methacryloxypropylsilanol | 7 | 6.5 | 6 | 5.5 | 5 | 4.5 | 4 |
| γ-Methacryloxypropyl-tris-(trimethylsiloxy)-silane | 70 | 65 | 60 | 55 | 50 | 47.9 | 44.8 |
| 1,3-Bis(γ-methacryloxypropyl)-1,1,3,3-tetrakis-(trimethylsiloxy)-disiloxane; | 5.6 | 5.2 | 4.8 | 4.4 | 4 | 3.6 | 3.2 |
| Methyl Methacrylate | 10 | 15 | 10 | 20 | 23 | 25 | 27 |
| Methacrylic Acid | 1 | 3 | 4.2 | 5 | 12 | 11 | 9 |
| Ethylene Glycol Dimethacrylate | 6.4 | 5 | 15 | 10 | 5 | 9 | 12 |
| Initiator | | | | | | | |
| 2,2' azobis(isobutyronitrile) | — | 0.2 | — | 0.4 | 0.4 | 0.2 | — |
| Benzoyl Peroxide | 0.3 | — | 0.1 | — | — | — | 0.2 |

| | Example | | | | | | |
|---|---|---|---|---|---|---|---|
| Comonomer | 12 | 13 | 14 | 15 | 16 | 17 | 18 |
| Bis(trimethylsiloxy)-γ-methacryloxypropyl-silanol | 3.5 | 3 | 5 | 1 | 1.3 | 20 | 7.0 |
| γ-Methacryloxypropyl-tris-(trimethylsiloxy)-silane | 47.7 | 35 | 50 | 42.2 | 56.2 | 30 | 57.4 |
| 1,3-Bis(γ-methacryloxy-propyl)-1,1,3,3-tetrakis-(trimethylsiloxy)-disiloxane; | 2.8 | 9.4 | 15 | 11.8 | 1 | 2.4 | 11.6 |
| Methyl Methacrylate | 29 | 35 | 21 | 30 | 25 | 27.6 | 10 |
| Methacrylic Acid | 10 | 10 | 8 | 8 | 5.5 | 8 | 7 |
| Ethylene Glycol Dimethacrylate | 8 | 7.6 | 1 | 7 | 11 | 8 | 8 |
| Initiator | | | | | | | |

TABLE D-continued

| | Parts by weight in copolymerization mixture | | | | | | |
|---|---|---|---|---|---|---|---|
| 2,2' azobis(iso-butyronitrile) | 0.2 | 0.2 | 0.2 | — | — | — | 0.2 |
| Benzoyl Peroxide | — | — | — | 0.3 | 0.3 | 0.3 | — |

| | Example | | | | | | |
|---|---|---|---|---|---|---|---|
| Comonomer | 19 | 20 | 21 | 22 | 23 | 24 | 25 |
| Bis(trimethylsiloxy)-γ-methacryloxypropyl-silanol | 5.4 | 5.8 | 5.9 | 6.1 | 5.8 | 1 | 4.3 |
| γ-Methacryloxypropyl-tris-(trimethylsiloxy)-silane | 44.3 | 47.6 | 48.4 | 50 | 47.6 | 8.2 | 35 |
| 1,3-Bis(γ-methacryloxy-propyl-1,1,3,3-tetrakis-(trimethylsiloxy)-disiloxane; | 14.3 | 14.6 | 10.7 | 4.9 | 4.6 | 60 | 30 |
| Methyl Methacrylate | 25 | 15 | 20 | 25 | 20 | 22.8 | 20.7 |
| Methacrylic Acid | 5 | 11 | 11 | 6 | 10 | 7 | 7 |
| Ethylene Glycol Dimethacrylate | 6 | 6 | 4 | 8 | 5 | 1 | 3 |
| Initiator | | | | | | | |
| 2,2' azobis(iso-butyronitrile) | 0.2 | 0.2 | — | — | 0.2 | 0.2 | 0.2 |
| Benzoyl Peroxide | — | — | 0.3 | 0.3 | — | — | — |

Following the general procedures of Example 1, copolymers are prepared of other comonomers, which, depending on the specific desired balance of properties of mechanical strength, dimensional stability, resistance to warpage, optical characteristics, oxygen permeability and wettability, are suitable for use in fabricating contact lenses according to the present invention.

Referring to Table D, the following substitutions can be made for all or part of the indicated monomers without departing from the present invention:

Bis(trimethylsiloxy)-methacryloxymethylsilanol or methyl-(trimethylsiloxy)-γ-methacryloxypropylsilanol for bis-(trimethylsiloxy)-γ-methacryloxypropylsilanol; methacryloxymethyl-tris-(trimethylsiloxy)silane or γ-acryloxymethyl-tris-(triethylsiloxy)silane for γ-methacryloxypropyl-tris-(trimethylsiloxy)silane; 1,3-bis(methacryloxymethy)-1,1,3,3-tetrakis(trimethylsiloxy)-disiloxane or 1,3-bis-(γ-methacryloxypropyl-1,1-dimethyl-3,3-bis-trimethylsiloxy-disiloxane for 1,3-bis(γ-methacryloxypropyl)-1,1,3,3-tetrakis(trimethylsiloxy)disiloxane; methyl acrylate, ethyl methacrylate or 2-ethoxyethyl methacrylate for methyl methacrylate; acrylic acid, acrylamide or 2-hydroxyethyl methacrylate for methacrylic acid; and 1,3-propylene diacrylate or tetraethylene glycol dimethacrylate for ethylene glycol dimethacrylate.

Various acceptable alternative initiators have been disclosed earlier with preferred initiators being shown at the bottom of Tables D-1, D-2, and D-3.

EXAMPLE 26

Representative lenses produced according to the present invention were subjected to microbiological testing for toxicity and physiological biocompatibility as recommended in the FDA Guidelines for "Toxicological Testing of New Contact Lenses and Soaking/Wetting Solutions Used With New Contact Lenses". The specimens met the FDA guidelines.

EXAMPLE 27

Copolymer formulations of the present invention were subjected to physical and chemical testing. The formulations were found to be chemically stable and provided the following typical physical characteristics.

| Properties | Specification | Test Results |
|---|---|---|
| Hardness | ANSI/ASTM D2240-75 | D79–D85 |
| Scratch resistance | ANSI Z80.6; 4.2 | $2 < X < 3$ |
| Absorption (normal saline) | ANSI Z80.6; 4.6.1 | $<2\%$ |
| Absorption (distilled water) | ANSI Z80.6; 4.6.2 | $<2\%$ |
| Wetting angle | CLMA procedure | 20°–30° |
| Gas permeability | Schema Versatae $Dk = (y) \times 10^{-11}$ $cm^2/ml\ O_2/sec\text{-}ml\text{-}mmHg$ at 37° C. by polarography | $Dk = 30\text{-}100 \times 10^{-11}$ |
| Shelf life | ANSI Z80.6; 4.4 | Unlimited |
| Luminous transmittance (colorless lenses) (370-740 nm) | ANSI Z80.6; 4.5 | $>90\%$ |
| Heat distortion | ANSI/ASTM D648 | $>60°$ C. |
| Dimensional stability | ANSI/ASTM D756 | $<1\%$ |
| Refractive Index | ANSI/ASTM D542 | 1.40–1.50 (Nd at 25° C.) |
| Tensile strength | ANSI/ASTM D638 | $1\text{-}3 \times 10^5$ psi |
| Flexural strength | ANSI/ASTM D790 | $2\text{-}6 \times 10^5$ psi |

EXAMPLE 28

Contact lenses formulated from the copolymer formulations of the present invention were shaped to provide spherical, toric, biotoric and aspheric characteristics. The lenses provided base curves of 6.5 to 9.0 mm, diameters of 7 to 10.5 mm and thicknesses of 0.05 to 0.70 mm to provide custom corneal fittings.

These lenses are found to conform to ANSI Z80.2 prescription requirements for first quality contact lenses and are capable of providing correction of refractive error in patients with non-therapeutic eyes having ametropias, including myopia, hyperopia and those with astigmatism.

From the foregoing, it becomes apparent that a new and useful copolymer composition, method for handling said copolymers to mold or cast them into optical lenses or blanks from which contact lenses may be shaped, and the buttons and lenses resulting therefrom have been herein described and illustrated which fulfill all of the aforesaid objectives in a remarkably unexpected fashion, it being understood that such modifications, alterations and adaptations as may readily occur to an artisan having the ordinary skills to which this invention pertains are intended within the spirit of the present invention which is limited only by the scope of the claims appended hereto.

Accordingly, what is claimed is:

1. A copolymer composition, especially suited for fabricating optical lenses having a DK value of at least $30 \times 10^{-11}$, comprising a copolymer of copolymerized comonomers containing:

(a) about one to about twenty percent by weight of an acryloxyalkylsilanol having the structure

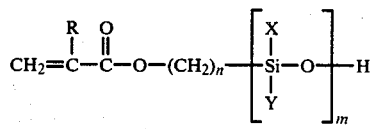

wherein
R=CH$_3$— or H—;
X, Y=C$_1$-C$_6$ alkyl; cyclohexyl; phenyl or Z

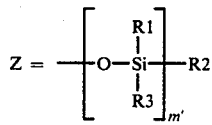

n=1-5
m=1-3; m'=1-3
R1=C$_1$-C$_6$ alkyl, cyclohexyl, or phenyl
R2=C$_1$-C$_6$ alkyl, cyclohexyl, or phenyl
R3=C$_1$-C$_6$ alkyl, cyclohexyl, or phenyl (b) about one to about fifteen percent by weight of a polyacryloxyalkylpolysiloxane having the structure

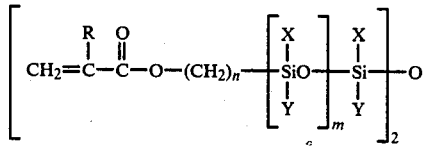

wherein:
R=CH$_3$— or H—;
m=0-3
n=1-5
X=C$_1$-C$_6$ alkyl, cyclohexyl, phenyl or Z;
Y=C$_1$-C$_6$ alkyl, cyclohexyl, phenyl or Z; and

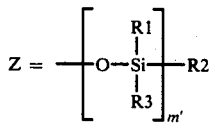

m'=1-3
R1=C$_1$-C$_6$ alkyl, cyclohexyl, or phenyl
R2=C$_1$-C$_6$ alkyl, cyclohexyl, or phenyl
R3=C$_1$-C$_6$ alkyl, cyclohexyl, or phenyl (c) about thirty to about seventy-five percent by weight of a siloxy substituted ester of acrylic or methacrylic acid having the structure:

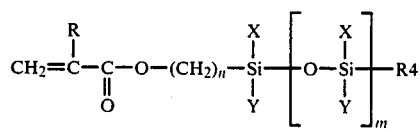

wherein
R=CH$_3$— or H—;
X=C$_1$-C$_6$ alkyl, cyclohexyl, phenyl or Z
Y=C$_1$-C$_6$ alkyl, cyclohexyl, phenyl or Z

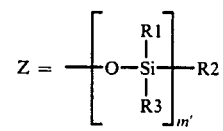

R1=C$_1$-C$_6$ alkyl, cyclohexyl, or phenyl; m=1-3
R2=C$_1$-C$_6$ alkyl, cyclohexyl, or phenyl; n=1-5
R3=C$_1$-C$_6$ alkyl, cyclohexyl, or phenyl; m'=1-3
R4=C$_1$-C$_6$ alkyl or cyclohexyl; and (d) about one to about thirty-five percent by weight of an alkyl or cycloalkyl acrylate or methacrylate having from one to 20 carbon atoms;

(e) about one to about twenty percent by weight of a polyol diacrylate as a cross-linking monomer; and (f) about one percent to about twenty percent by weight of a wetting monomer.

2. A composition according to claim 1 in which said comonomer mixture includes, prior to polymerization, an initiator in an amount equal to about 0.1 percent to about 1.0 percent by weight of said comonomer mixture.

3. A composition according to claim 2 in which said initiator is selected from the group consisting of benzoyl peroxide, t-butyl peroxypivalate, 2,2'-azobis(isobutyronitrile), and 2,2'-azobis(2,4-dimethylvaleronitrile).

4. The composition according to claim 2 in which said crosslinking monomer is selected from the group consisting of ethylene glycoldimethacrylate and butylene glycoldimethacrylate.

5. A composition according to claim 2 in which said wetting monomer is selected from the group consisting of methacrylic acid, acrylic acid, acrylamide, and 2-hydroxyethyl methacrylate.

6. A composition according to claim 4 in which said wetting monomer is selected from the group consisting of methacrylic acid, acrylic acid, acrylamide, and 2-hydroxyethyl methacrylate.

7. A composition according to claim 1 containing from about three to about twelve percent by weight of a wetting agent selected from the group consisting of methacrylic acid, acrylic acid, acrylamide, and 2-hydroxyethyl methacrylate; from about three to about twelve percent by weight of a crosslinker selected from the group consisting of ethylene glycol dimethacrylate and butylene glycol dimethacrylate; and from 0.1 to about 1.0 percent by weight of an initiator selected from the group consisting of benzoyl peroxide, t-butyl peroxypivolate, 2,2'-azobis(isobutyronitrile), and 2,2'-azobis(2,4-dimethylvaleronitrile).

8. A composition according to claim 7 in which said crosslinker is ethylene glycol dimethacrylate.

9. A composition according to claim 7 containing from about two to about ten percent by weight of said acryloxylalkysilanol, from two to about twelve percent by weight of said polyacryloxyalkylpolysiloxane; from about thirty-five to about sixty percent by weight of said siloxy substituted ester of acrylic or methacrylic acid; and from about ten to about thirty-five percent by weight of said alkyl or cycloalkyl acrylate or methacrylate having from one to twenty carbon atoms.

10. A composition according to claim 9 containing from about five to about eleven percent by weight of said wetting agent and from about five to about ten percent of said crosslinker.

11. A composition according to claim 10 containing from about ten to about twenty-five percent by weight of said alkyl or cycloalkyl acrylate or methacrylate having from one to twenty carbon atoms.

12. A composition according to claim 11 in which said crosslinker is ethylene glycol dimethacrylate.

13. As a new article of manufacture, an optical lens fabricated from the copolymer of copolymerized comonomers of claim 1.

14. An article of manufacture according to claim 13 comprising a contact lens.

15. As a new article of manufacture, a contact lens button fabricated from the copolymer of copolymerized comonomers of claim 1.

16. As a new article of manufacture, a contact lens formed from the button of claim 15.

* * * * *